United States Patent
Moore, Jr. et al.

(10) Patent No.: US 12,003,968 B2
(45) Date of Patent: Jun. 4, 2024

(54) VERIFYING INDICATED DEVICE LOCATION USING ANALYSIS OF REAL-TIME DISPLAY ELEMENT INTERACTION

(71) Applicant: International Business Machines Corporation, Armonk, NY (US)

(72) Inventors: John E. Moore, Jr., Pflugerville, TX (US); Humberto Orozco Cervantes, Tonalá (MX); Vladimir Garcia Saavedra, Tlaquepaque (MX); Carolina Garcia Delgado, Zapopan (MX); Paul Llamas Virgen, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 329 days.

(21) Appl. No.: 17/452,719

(22) Filed: Oct. 28, 2021

(65) Prior Publication Data

US 2023/0138914 A1    May 4, 2023

(51) Int. Cl.
*H04W 12/63*    (2021.01)
*H04W 4/02*     (2018.01)

(52) U.S. Cl.
CPC ............ *H04W 12/63* (2021.01); *H04W 4/025* (2013.01)

(58) Field of Classification Search
CPC ............................ H04W 12/63; H04W 4/025; H04L 2463/082; H04L 63/107
See application file for complete search history.

(56) References Cited

U.S. PATENT DOCUMENTS 8,260,262 B2    9/2012  Ben Ayed
10,375,083 B2 * 8/2019  Arunkumar ........... H04W 12/08
(Continued)

FOREIGN PATENT DOCUMENTS

EP    1841174 B1    2/2015
WO   2012152995 A1  11/2012

OTHER PUBLICATIONS

"Roll, Pitch, and Yaw", Smithsonian National Air and Space Museum, last printed Oct. 18, 2021, 3 pages, <https://howthingsfly.si.edu/flight-dynamics/roll-pitch-and-yaw>.

(Continued)

*Primary Examiner* — Kabir A Timory
(74) *Attorney, Agent, or Firm* — Michael A. Petrocelli

(57) ABSTRACT

A computer receives a request to verify a location of a primary device. The computer receives an Indicated Primary Device Location "IPDL". The computer shows within a display a dynamically located virtual representation of a predetermined Astronomical Reference Object "ARO". The virtual representation indicates a real-time offset between a Display Reference Indicator "DRI" and the ARO. The computer receives primary device orientation metadata from sensors associated with the primary device and generates a Measured Primary Device Orientation "MPDO" when the device is in a location verification orientation. The computer calculates an Expected Device Orientation "EDO" for a reference device arranged in the PDVP while at the IPDL. The computer generates a Location Verification Value "LVV" based, at least in part, on comparing the MPDO and the EDO. When the computer determines the LVV exceeds a predetermined verification threshold, providing an indication that the indicated primary device location is verified.

20 Claims, 11 Drawing Sheets

(56) References Cited

U.S. PATENT DOCUMENTS

| | | | |
|---|---|---|---|
| 10,827,452 B2* | 11/2020 | Wirola | H04W 64/003 |
| 11,303,624 B2* | 4/2022 | Burns | H04W 12/06 |
| 2011/0026716 A1 | 2/2011 | Tang | |
| 2013/0160088 A1 | 6/2013 | Mcfarland | |
| 2014/0282877 A1 | 9/2014 | Mahaffey | |
| 2016/0196414 A1 | 7/2016 | Stuntebeck | |
| 2016/0321445 A1 | 11/2016 | Turgeman | |
| 2017/0098068 A1 | 4/2017 | Mantri | |
| 2020/0045055 A1 | 2/2020 | Diacetis | |
| 2020/0285824 A1 | 9/2020 | Gaathon | |

OTHER PUBLICATIONS

Mell, et al., "The NIST Definition of Cloud Computing", National Institute of Standards and Technology, Special Publication 800-145, Sep. 2011, 7 pages.

Ryu, et al., "Implicit Secondary Authentication for Sustainable SMS Authentication", Sustainability 2019, 11, 279, 14 pages, <https://www.mdpi.com/2071-1050/11/1/279/htm>.

* cited by examiner

```
┌─────────────────────────────────────────────────────────────────────┐
│ in response to receiving a request to verify a location of a        │
│ primary device communicatively connected with a computer,           │
│ receiving an Indicated Primary Device Location "IPDL"               │
│                            202                                      │
└─────────────────────────────────────────────────────────────────────┘
                                  ↓
┌─────────────────────────────────────────────────────────────────────┐
│ presenting within a Primary Device Display "PDD", a virtual         │
│ representation of a predetermined Astronomical Reference Object     │
│ "ARO" having a known ARO location remote from the primary device,   │
│ the virtual representation having a dynamic location within the PDD │
│ synchronized, at least in part, with a substantially real-time      │
│ relative offset between a Display Reference Indicator "DRI" and     │
│ the known ARO location                                              │
│                            204                                      │
└─────────────────────────────────────────────────────────────────────┘
                                  ↓
┌─────────────────────────────────────────────────────────────────────┐
│ responsive to receiving an indication that the primary device is    │
│ in a Primary Device Verification Position "PDVP" in which the DRI   │
│ and the ARO virtual representation have a preferred amount of       │
│ overlap within the display, receiving primary device orientation    │
│ metadata from a set of orientation indicating sensors associated    │
│ with the primary device, and generating a Measured Primary Device   │
│ Orientation "MPDO" therefrom                                        │
│                            206                                      │
└─────────────────────────────────────────────────────────────────────┘
                                  ↓
┌─────────────────────────────────────────────────────────────────────┐
│ calculating an Expected Device Orientation "EDO" for a reference    │
│       device arranged in the PDVP while at the IPDL                 │
│                            208                                      │
└─────────────────────────────────────────────────────────────────────┘
                                  ↓
┌─────────────────────────────────────────────────────────────────────┐
│ generating a Location Verification Value "LVV" based, at            │
│ least in part, on comparing the MPDO and the EDO                    │
│                            210                                      │
└─────────────────────────────────────────────────────────────────────┘
                                  ↓
┌─────────────────────────────────────────────────────────────────────┐
│ responsive to determining the LVV exceeds a predetermined           │
│ verification threshold, providing an indication that the indicated  │
│ primary device location is verified                                 │
│                            212                                      │
└─────────────────────────────────────────────────────────────────────┘
                                  ↓
                           ( process ends )
                           (     214     )
```

FIG. 2

| 140 | 142 | 144 | 146 |
|---|---|---|---|
| Indicated Device Location (e.g., placement on Earth) | Measured Primary Device Orientation (MPDO) | Expected Device Orientation While in Verification Position at Indicated Device Location (EDO) | Location Verification Value (e.g., MPDO and EDO similarity) |
| IDL #1 | MPDO #1 | EDO #1 | LVV#1 |

FIG. 7 — 700

| 150 | 152 | 154 |
|---|---|---|
| Target Device Bearing | Measured Device Bearing (e.g., output from device compass, gyroscope, etc.) | Device Bearing Verification Value (e.g., TBD and MDBO similarity) |
| TDB #1 | MDBO #1 | TLVV#1 |

FIG. 8 — 800

VERIFYING INDICATED DEVICE LOCATION USING ANALYSIS OF REAL-TIME DISPLAY ELEMENT INTERACTION

BACKGROUND

The present invention relates generally to the field of device authentication, and more specifically, to verifying whether a device is located at an indicated location.

Multifactor Authentication (MFA) is an authentication methodology in which items from several independent credential categories are provided to verify aspects (e.g., a user identity) during a login or other secure transaction. In some settings, an MFA system will request non-public (and user-known) information from a user attempting to conduct a secure transaction. By requesting non-public information from users, MFA systems increase the likelihood that only authorized users are conducting secure transactions. The nature of the non-public information requested by MFA systems varies widely among systems, and some types of requested information provide more security than others.

SUMMARY

According to one embodiment, a computer-implemented method verifying a device location includes, in response to receiving a request to verify a location of a primary device communicatively connected with a computer, receiving an Indicated Primary Device Location "IPDL". The computer presents within a Primary Device Display "PDD", a virtual representation of a predetermined Astronomical Reference Object "ARO" having a known ARO location remote from the primary device. The virtual representation has a dynamic location within the PDD synchronized, at least in part, with a substantially real-time relative offset between a Display Reference Indicator "DRI" and the known ARO location. The computer responsive to receiving an indication that the primary device is in a Primary Device Verification Position "PDVP" in which the DRI and the ARO virtual representation have a predetermined amount of overlap within the display, receives primary device orientation metadata from a set of orientation indicating sensors associated with the primary device, and generates a Measured Primary Device Orientation "MPDO" using the MPDO. The computer calculates an Expected Device Orientation "EDO" for a reference device arranged in the PDVP while at the IPDL. The computer generates a Location Verification Value "LVV" based, at least in part, on comparing the MPDO and the EDO. The computer, in response to determining the LVV exceeds a predetermined verification threshold, provides an indication that the indicated primary device location is verified. According to aspects of the invention, the known ARO location changes with time and the expected PDVD orientation is calculated using a set of time-sensitive ARO position metadata available to the computer and a relevant reference time from a time source available to the computer. According to aspects of the invention, the indicated device location is substantially the same as a pre-established target location. According to aspects of the invention, the pre-established target location is substantially the same as a user-provided address. According to aspects of the invention, the orientation indicating sensors associated with the PVD are among a pre-established set of sensors remote from the device. According to aspects of the invention, the display presents a real-time location of multiple predetermined AROs on a celestial map. According to aspects of the invention, the primary device is selected from group consisting of smart phone, a smart watch, and a tablet.

According to another embodiment A system for verifying a device location includes a computer system comprising a computer readable storage medium having program instructions embodied therewith, the program instructions executable by a computer to cause the computer to: in response to receiving a request to verify a location of a primary device communicatively connected with a computer, receive an Indicated Primary Device Location "IPDL"; present within a Primary Device Display "PDD", a virtual representation of a predetermined Astronomical Reference Object "ARO" having a known ARO location remote from the primary device, the virtual representation having a dynamic location within the PDD synchronized, at least in part, with a substantially real-time relative offset between a Display Reference Indicator "DRI" and the known ARO location; responsive to receiving an indication that the primary device is in a Primary Device Verification Position "PDVP" in which the DRI and the ARO virtual representation have a predetermined amount of overlap within the display, receive primary device orientation metadata from a set of orientation indicating sensors associated with the primary device, and generate a Measured Primary Device Orientation "MPDO" therefrom; calculate an Expected Device Orientation "EDO" for a reference device arranged in the PDVP while at the IPDL; generate a Location Verification Value "LVV" based, at least in part, on comparing the MPDO and the EDO; and responsive to determining the LVV exceeds a predetermined verification threshold, provide an indication that the indicated primary device location is verified.

According to another embodiment A computer program product for verify a device location, the computer program product comprising a computer readable storage medium having program instructions embodied therewith, the program instructions executable by a computer to cause the computer to: in response to receiving a request to verify a location of a primary device communicatively connected with a computer, receive, using the computer, an Indicated Primary Device Location "IPDL"; present, using the computer, within a Primary Device Display "PDD", a virtual representation of a predetermined Astronomical Reference Object "ARO" having a known ARO location remote from the primary device, the virtual representation having a dynamic location within the PDD synchronized, at least in part, with a substantially real-time relative offset between a Display Reference Indicator "DRI" and the known ARO location; responsive to receiving an indication that the primary device is in a Primary Device Verification Position "PDVP" in which the DRI and the ARO virtual representation have a predetermined amount of overlap within the display, receive, using the computer, primary device orientation metadata from a set of orientation indicating sensors associated with the primary device, and generate a Measured Primary Device Orientation "MPDO" therefrom; calculate, using the computer, an Expected Device Orientation "EDO" for a reference device arranged in the PDVP while at the IPDL; generate, using the computer, a Location Verification Value "LVV" based, at least in part, on comparing the MPDO and the EDO; and responsive to determining the LVV exceeds a predetermined verification threshold, provide, using the computer, an indication that the indicated primary device location is verified.

The present disclosure recognizes and addresses the shortcomings and problems associated with balancing ease of use and heightened security in secure transactions.

The present disclosure recognizes and addresses the shortcomings and problems associated with MFA systems that rely on static access credentials.

The present disclosure recognizes and addresses the shortcomings and problems associated with MFA systems that rely on access credentials that may be obtained by unauthorized users.

Aspects of the invention provide verifiable credentials suited for self-identification in secure login settings.

Aspects of the invention use device locating sensors (e.g., device-integrated sensors, such as a device gyroscope or GPS components) or other preselected positioning sensors (e.g., coordinated sensors, such as Internet-of-Things (IoT) devices or similar location-indicating).

Aspects of the invention combine real-time device location information (including three-dimensional orientation and device location), along with astronomical reference object (e.g., the Sun, the Moon, planets, etc.) location metadata (e.g., including time-based celestial coordinates and movement patterns, galactic or other astronomical coordinates, etc.), to dynamically indicate identified device and reference object relative positions within a dynamic display.

Aspects of the invention obtain device position from device-integrated sensors (e.g., including a device-based gyroscope, satellite-based positioning components, etc.) or other preselected positioning sensors (e.g., coordinated sensors, such as Internet-of-Things (IoT) devices or similar location-indicating).

According to aspects of the invention, an indicated location may be provided by a user seeking to log in to a secure system, and aspects of the invention will assess whether the user-provided location is a representation of the actual device location.

Aspects of the invention provide a dynamic display that incorporates an augmented reality (AR) overlay or similar virtual reality technology (e.g., a real-time sky or celestial body mapping application) to indicate device orientation with respect to a preselected astronomical object.

Aspects of the invention verify an indicated device location by comparing a sensor-identified device orientation relative to a preselected astronomical object to an expected device orientation.

According to aspects of the invention, the indicated device location is a targeted location, such as a predefined, user-provided address.

According to aspects of the invention, multiple interconnected smart devices (e.g., a smartwatch, a tablet, a cellphone, etc.) and conventional positioning devices may be used cooperatively to accomplish a secure authentication.

According to aspects of the invention, an identified device location may be verified by moving the device with respect to a astronomic reference object and comparing the measured device movement (or position, etc.) with expected device movement (or position, etc.) associated with the identified location.

Aspects of the invention generate a device movement database (e.g., via a device-mounted gyroscope, a device-based Global Navigation Satellite Systems components, through remote sensors adapted and arranged to indicate location-relevant aspects of an identified device, etc.) to associate motion and position of the device with the "overlay virtual reality technology" or the astronomic coordinates, and its associated location. This also can be used with combination of user devices to accomplish a secure authentication (smartwatch, tablet, cellphone, etc.).

Aspects of the present invention are especially useful to provide authentication during a secure transaction or other use case in which heightened security is desired (e.g., in a Multi-Factor Authentication "MFA" arrangement). According to aspects of the invention, a display associated with the device provides an enhanced viewing experience (e.g., Augmented. Reality "AR" overlay or Virtual Reality VR interface), and a user is asked to move the selected device in a predetermined pattern, or in a pattern illustrated within the display. According to aspects of the invention, a real-time representation of Astronomical Reference Object "ARO" (e.g., a predetermined celestial body having a known dynamic location) is shown in the display, and the user is directed to place the device into a diagnostic, location verification orientation with respect to the ARO.

Aspects of the invention provide a verified, location-based identification factor useful in "MFA" arrangements, using three-dimensional "3D" position data (e.g., gyroscope-sensed movements and data streams from groups of cooperative sensors arranged to register device position and movement), including measurements known as roll (x), pitch (y) & yaw(z)) sensors suitable three-dimensional. According to aspects of the invention, 3D position data is used to present an enhance, composite display combine that shows relative positions of the device and a selected Astronomical Reference Object "ARO". It is noted that the resultant device orientation for a device with respect to a given ARO will vary over time, in accordance with device location, such that determining a device is in an expected orientation with respect to a predetermined ARO at a known time and indicated location will provide a reliable assurance (e.g., a location-based authentication credential) that the device is truly at the indicated location.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are set forth as below as:

FIG. 2 is a flowchart illustrating a method, implemented using the system shown in FIG. 1, of confirming a device location using real-time celestial body mapping, according to embodiments of the present invention.

FIG. 7 is a table schematically representing device location verification information generated by aspects of the system of FIG. 1 for a primary device according to aspects of the invention.

FIG. 8 is a table schematically representing device location verification information generated by aspects of the system of FIG. 1 for a secondary device according to aspects of the invention.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a participant" includes reference to one or more of such participants unless the context clearly dictates otherwise.

Figure 1:
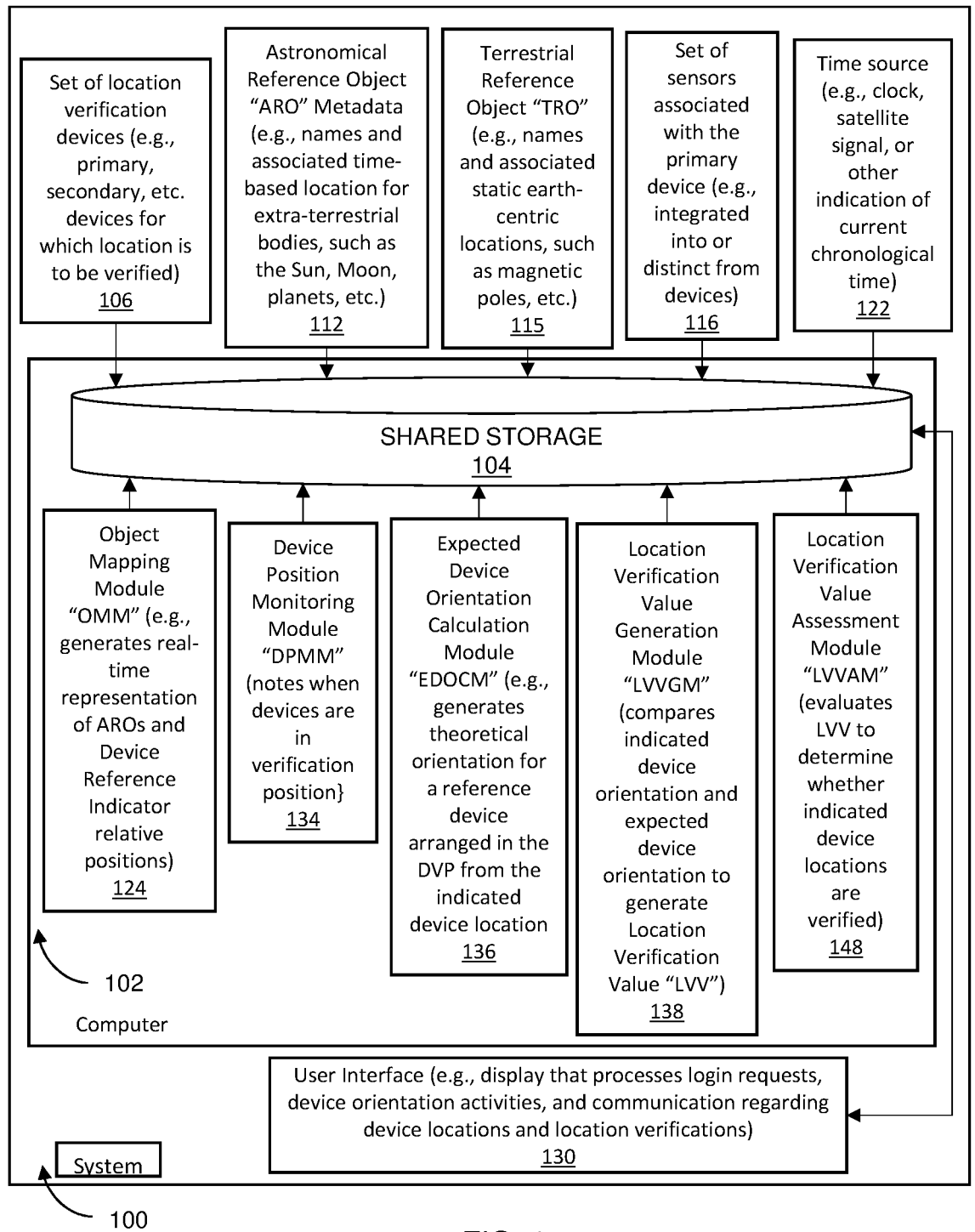
FIG. 1 is a schematic block diagram illustrating an overview of a system for computer-implemented method of confirming a device location using real-time celestial body mapping, according to embodiments of the present invention.

Now with combined reference to the Figures generally and with particular reference to FIG. 1 and FIG. 2, an overview of a method for optimizing microphone (or similar input component) operation during a teleconference usable within a system 100 as carried out by a server computer 102 having optionally shared storage 104.

The server computer 102 is communicatively connected with a set of location verification devices 106 (e.g., primary, secondary, etc. devices for which location is to be verified). According to aspects of the invention, the set of devices can include one or more primary device 106 (e.g., typically a smart device, such as a smartwatch, a tablet, a cellphone, etc.) and one or more secondary device 108 (e.g., typically a conventional positioning device, such as an electronic compass, GPS receiver, or other similar positioning device) for which an indicated location is to be verified. In an embodiment, the indicated device location is a targeted location, such as a predefined, user-provided address.

The server computer 102 receives a corpus of Astronomical Reference Object "ARO" metadata 112. According to aspects of the invention, the ARO metadata includes names of, and associated time-based location information for, extra-terrestrial bodies 113 (e.g., the Sun, Moon, planets, etc.) and associated Body Location Reference Indicator "BLRI" 114.

The server computer 102 receives a corpus Terrestrial Reference Object "TRO"s 115. According to aspects of the invention, the TRO metadata includes names of, and associated substantially static locations of, Earth-centric references (e.g., magnetic poles, etc.).

Figure 4A:
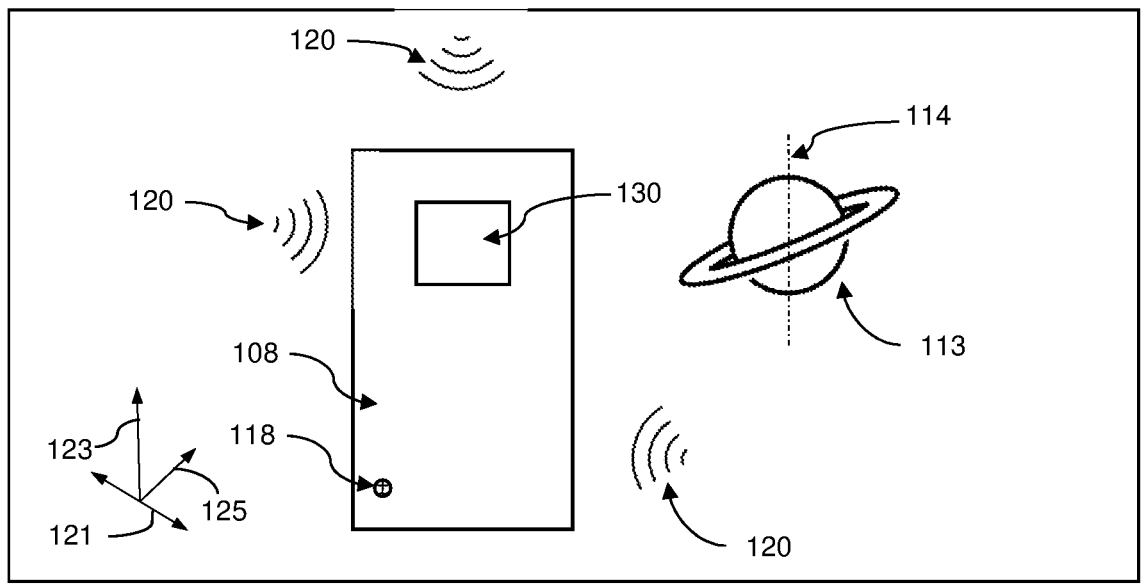
FIG. 4A is a schematic representation of aspects of a primary device according to the system of the system of FIG. 1 shown in use.
Figure 5A:
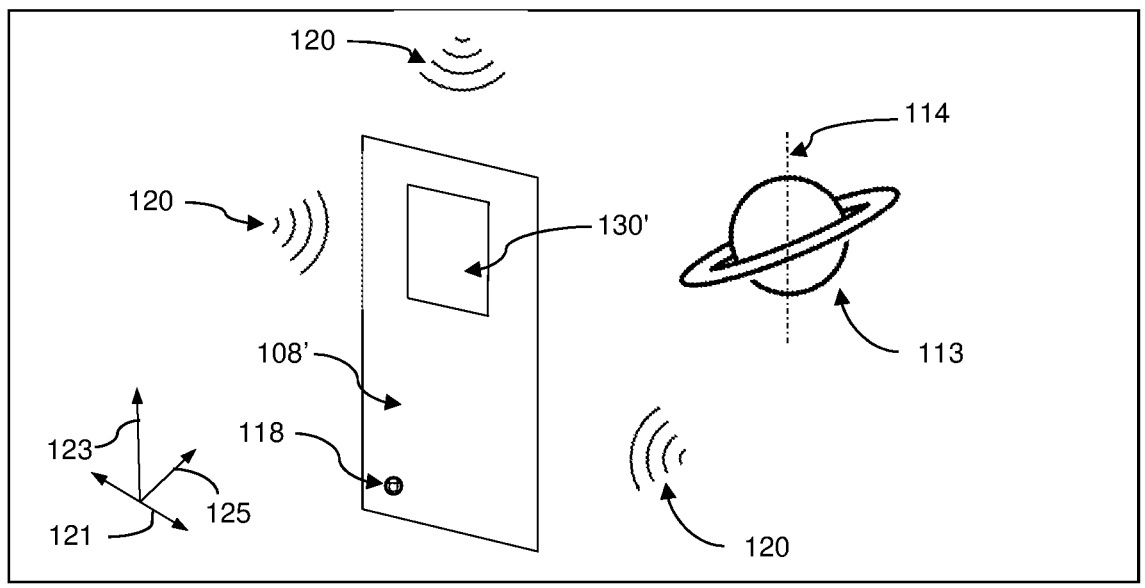
FIG. 5A is a schematic representation of aspects of a primary device according to the system of FIG. 1 shown in use in a primary device verification position.

The server computer 102 is communicatively connected with a set of location-indicating sensors 116 associated with the devices 108, 110 that indicate motion (e.g., device pitch, roll, and yaw) or position of the device in three dimensions (e.g., along an x-axis 121, y-axis 123, and z-axis 125 each represented schematically in FIG. 4A and FIG. 5A). According to aspects of the invention, the set of sensors 116 integrated sensors 118 (e.g., gyroscopes, Global Position System "GPS" receivers, or other movement and device-mounted position indicating components selected by one of skill in this field) incorporated into the devices 108, 110. According to aspects of the invention, the set of sensors 116 includes remote sensors 120 (e.g., such as Wi-Fi positioning sensors, Internet of Things (IoT) sensors, and other components adapted and arranged to indicate device location) that are distinct from the devices 108, 110 and within a suitable device monitoring location proximate the device 108 (e.g., as shown schematically in FIG. 4A).

The server computer 102 is in communication with a chronological time source 122. According to aspects of the invention, the time source is a signal from an atomic clock, a satellite signal, or other indication of current time selected by one of skill in this field. According to aspects of the invention, the server computer 102 uses information from the time source 122 when calculating dynamic, time-based locations for an ARO 113.

The server computer 102 includes Object Mapping Module "OMM" 126. According to aspects of the invention, the OMNI 126 generates real-time representations 126 of AROs 113 and a Device Reference Indicator "DRI" 128 in an integrated display 130 (or other user interface), presenting ARO and DRI relative positions in real-time (shown schematically at FIG. 4A and FIG. 4B). In an embodiment, the real-time representation 126 of an AROs 113 is a scalable icon that represent the astronomical reference object (e.g., such as the planet Saturn, or other celestial body), and the DRI 128 is a pair of intersecting line segments (e.g., a "+" sign). According to aspects of the invention, the primary device display 130 provides an indication of a relative offset 132 between the DRI 128 and the Body Location Reference Indicator "BLRI" 114 associated with the ARO 113. According to aspects of the invention, the "BLRI" 114 coincides with a calculated axis of rotation for a given celestial body, a body center, or other reference object attribute having a predictable motion selected by one of skill in this field.

According to aspects of the invention, the OMM 124 uses the ARO metadata 112 and a celestial mapping algorithm (or similar ARO tracking routine known to those of skill in this field) available to the server computer 102 to track BLRI 114 position relevant for viewing in the indicated location for the primary device 108. In an embodiment, the display 130 portrays an Augmented Reality experience, in which substantially real-time relative positions of the DRI 128 and real-time ARO representation 126 are shown.

Figure 4B:
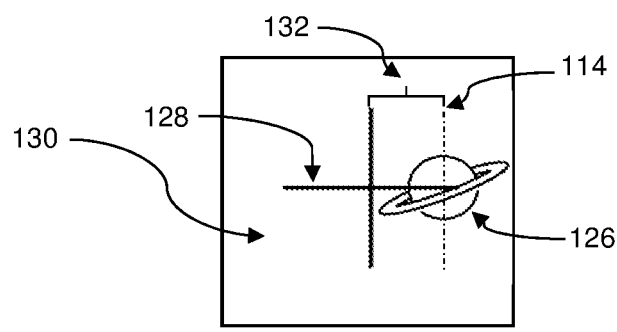
FIG. 4B is a schematic representation of aspects of a primary device according to the system of the system of FIG. 1 shown in use.
Figure 5B:
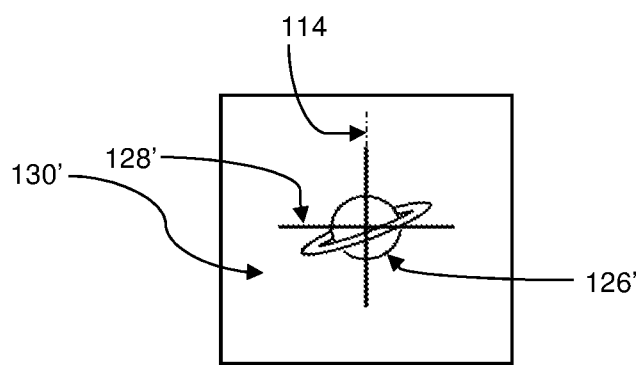
FIG. 5B is a schematic representation of aspects of a primary device according to the system of FIG. 1 shown in use in a primary device verification position.

The server computer 102 includes a Device Position Monitoring Module "DPMM" 134 that monitors the relative positions of the DRI 128 and ARO representations 126 within the user interface 130 (e.g., a primary device display, shown schematically in FIG. 4B). According to aspects of the invention, the DPMM 134 identifies instances of DRI 128' and ARO representation 126' co-alignment (e.g., as shown schematically in FIG. 5A and FIG. 5B) and notes when DRI and ARO displacement 132' is below a co threshold indicating substantial overlap. In an embodiment, these moments of substantial overlap are trigger events in which the DPMM 134 recognizes the primary device 108' has been moved into a Device Verification Position "DVP" (e.g., as shown schematically in FIG. 5A, which may be represented by roll, pitch, and yaw values), and the display 130' shows substantial alignment between the DRI 128' and a relevant BLRI 114 (e.g., as shown schematically in FIG. 5B). In an embodiment, the DPMM 134 recognizes the occurrence of the primary device occupying a DVP when the indicated overlap shows a relative displacement 132 (e.g., offset between DRI 128 and body location reference indicator 114) having an apparent distance that is less than 10% of the apparent length of a line segment forming the DRI 128. It is noted that the predetermined overlap threshold may be larger or smaller and may be selected by other methods, as selected in accordance with the judgment of one skilled in this field.

The server computer 102 includes Expected Device Orientation Calculation Module "EDOCM" 136 that generates a theoretical orientation (e.g., as represented by roll, pitch, and yaw values) expected for a hypothetical reference device arranged in the DVP from the indicated device location. According to aspects of the invention, the server computer 102 uses the expected orientation as a target orientation when verifying the location of the primary device 108. According to aspects of the invention, the reference device generated by the EDOCM 136 is a hypothetical version of the primary device 108, and the EDOCM applies portions of the celestial mapping algorithm (or similar ARO tracking routine) available to the server computer 102 to determine an expected DVP orientation (e.g., indicated by a set axial roll, pitch, and yaw values relative to the x-axis 121, y-axis 123, and z-axis 125) with respect to the selected ARO 113 for a device in the indicated primary device location. In an embodiment, the reference device has an associated theoretical DRI in substantially-perfect alignment with the selected ARO. According to aspects of the invention, EDOCM-generated reference device would, if represented within the display 130, have a relative displacement 132 (e.g., an offset between an associated DRI and body location reference indicator 114) near (or equal to) zero.

The server computer 102 includes Location Verification Value Generation Module "LVVGM" 138 that compares, with supplemental reference to FIG. 7, for a device at an indicated device location 140 (e.g., established by data collected from sensors 116, 118 or provided manually by a user), a measured device orientation 142 (e.g., represented by roll, pitch, and yaw metadata collected from sensors 116, 118) and the expected device orientation 144 (e.g., represented by roll, pitch, and yaw values for the reference device, as generated by the EDOCM 136) to calculate a Location Verification Value "LVV" 146 (e.g., each of which is represented schematically within table 700 of FIG. 7). According to aspects of the invention, the LVV 146 is a unitless value that indicates a similarity between the measure device orientation 142 and the expected device orientation 144. It is noted that the LVV may be calculated via a cosine similarity assessment method, through a simple coordinate difference calculation, or as the result of another orientation comparison methodology selected by one of skill in this field.

The server computer 102 includes Location Verification Value Assessment Module "LVVAM" 150 that evaluates the LVV 146 to determine whether the indicated device location is verified. In particular, the LVVAM 150 determines whether the LVV 146 exceeds a verification threshold. In an embodiment, the verification threshold is 95% of a maximum similarity value (e.g., 95% of unity, when measured by cosine similarity assessments) or other value selected in accordance with the judgment of one skilled in this field. According to aspects of the invention, when the LVV exceeds the verification threshold, the LVVAM 150 determines that the primary device 108 is occupying a measured orientation 142 while in the DVP (e.g., shown in FIG. that is sufficiently similar to an expected orientation 144 for a device located at the indicated location 140. Aspects of the invention recognize that substantially-perfect alignment of the DRI 128 and BLRI for a device 108 located at an indicated location on Earth occurs when the device is in a specific, time-relevant orientation, and if the measured orientation 142 is sufficiently close to the expected orientation 144 (e.g., exceeding the verification threshold) for a hypothetical device located in the indicated location 140, then the device may be deemed to be at a location that matches the indicated location, and the LVVAM 150 verifies the device location. According to aspects of the invention, the LVVAM 150 provides an indication of a verified device location within a user interface (e.g., display 130). According to aspects of the invention, the server computer 102 approves a secure login request when the LVV 146 exceeds the exceeding the verification threshold.

Figure 6A:
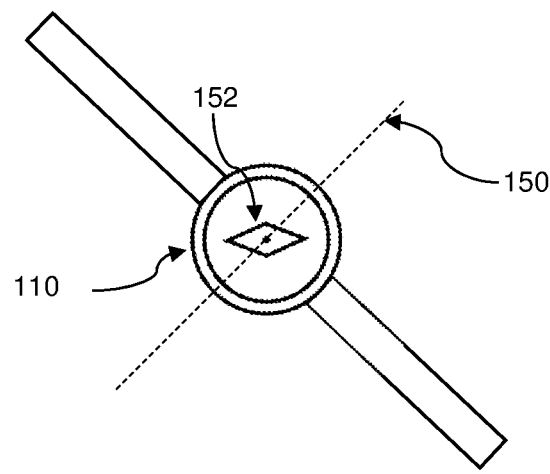
FIG. 6A is a schematic representation of aspects of a secondary device according to the system of FIG. 1 shown in use in a device verification position.
Figure 6B:
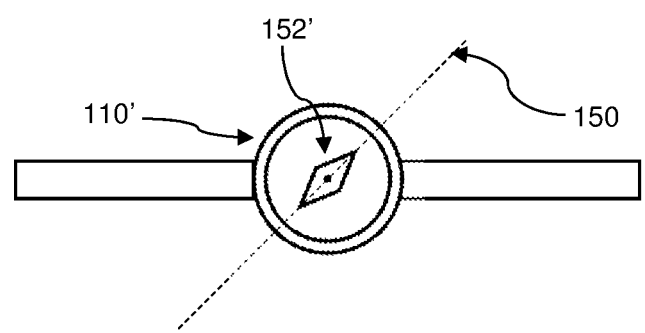
FIG. 6B is a schematic representation of aspects of a secondary device according to the system of FIG. 1 shown in use in a device verification position.

It is noted that in an embodiment, the server computer 102 is in communication with a secondary device 110 (e.g., as shown schematically in FIGS. 6A and 6B), such as a wrist-mounted compass or other device capable of indicating alignment with Earth-bound references, such as an indication of a magnetic pole 150. As shown with cooperative reference to FIG. 6A and FIG. 6B, a user associated with the secondary device 110 includes a Secondary Device Reference Indicator SDRI 152 (e.g., such as an indication of compass-based bearing or other relatively fixed, terrestrial reference selected by one skilled in this field). According to aspects of the invention, the DPMM 134 will using integrated sensors 118 (e.g., a device compass or gyroscope) to generate a measured device bearing 152, and as the SDRI 152 shifts with respect to a Target Device Bearing 150 (e.g., a NE compass bearing or similar reference selected by one of skill in this field), the secondary device 110 may move into a Secondary Device Verification Position "SDVP" 152', in which the SDRI is in substantial alignment with the Target Device Bearing 150 (e.g., as shown schematically in FIG. 6B). According to aspects of the invention, the DPMM 134 will note this occurrence and trigger the LVVGM 138 to compare the measured device bearing 152' in the SDVP to the target device reference 150 and generate a Device Bearing Verification Value "DBVV" 154 (each of which is represented schematically in table 800 of FIG. 8). According to aspects of the invention, when the measured secondary device bearing 152 is substantially equal to a target bearing 150 (e.g., within five degrees or some other threshold established by one of skill in this field), the server computer 102 will determine that the secondary device 110 is in a preferred orientation (e.g., substantially aligned with a target bearing 150). In an embodiment, the server computer 102 may consider this secondary device orientation 152 when verifying a user location during multifactor authentication.

Now with specific reference to FIG. 2, and to other figures generally, a computer-implemented method of confirming a device location in support of a multifactor secure login request using real-time celestial body mapping using the system 100 described above will be described.

The server computer 102 at block 202, in response to receiving a request to verify a location of a primary device communicatively connected with the server computer, receives an Indicated Primary Device Location "IPDL". According to aspects of the invention, the IPDL may be received from sensors 118, 120 associated with the device, or the IPDL may be provided manually by a user.

The server computer 102 at block 204, via Object Mapping Module "OMNI" 124, generates a real-time representation 126 of ARO and Device Reference Indicator relative positions. In particular, the server computer presents within a Primary Device Display "PDD" (e.g., user interface or display 130) a virtual representation 126 of a predetermined Astronomical Reference Object "ARO" having a known ARO location 114 (e.g., Body Location Reference Indicator "BLRI") remote from the primary device 110. According to aspects of the invention, the virtual representation 126 occupies a dynamic location within the device display 130. In an embodiment the virtual representation 126 is synchronized, at least in part, with a substantially real-time relative offset 132 between a Display Reference Indicator "DRI" 128 and the known ARO location (e.g., BLRI 114).

The server computer 102 at block 206, via Device Position Monitoring Module "DPMM" 134, notes when a device 110 is in verification position. In particular, in response to receiving an indication that the primary device 110 is in a Primary Device Verification Position "PDVP" (e.g., an orientation in which the DRI 128' and the ARO virtual representation 126' have a preferred amount of overlap within the display 130, the server computer 102 receives primary device orientation metadata from a set of orientation indicating sensors 118, 120 associated with the primary device. In an embodiment, the server computer 102, via DPMM 134 generates a Measured Primary Device Orientation "MPDO" 142 from the sensor data.

The server computer 102 at block 208, via Expected Device Orientation Calculation Module "EDOCM" 136, generates, as noted above, a theoretical orientation 144 expected for a reference device arranged in the DVP from the indicated device location 140. In particular, the server computer 102 calculates an Expected Device Orientation "EDO" 144 for a reference device arranged in the PDVP while at the IPDL.

The server computer 102 at block 210, via Location Verification Value Generation Module "LVVGM" 138, compares a measured primary device orientation 142 and expected device orientation 144 to generate Location Verification Value "LVV" 146. In particular, the server computer 102 generates, as described above, a Location Verification Value "LVV" 146 based, at least in part, on comparing the MPDO 142 and the EDO 144.

The server computer 102 at block 212, via Location Verification Value Assessment Module "LVVAM" 148 evaluates the LVV 146 to determine whether the indicated device location is authentic (e.g., is verified). In an embodiment, the server computer 102 provides, in response to determining the LVV exceeds a predetermined verification threshold, an indication that the indicated primary device location is verified. According to aspects of the invention, the server computer 102 will permit a secure system login when the primary device location is verified.

Figure 3:
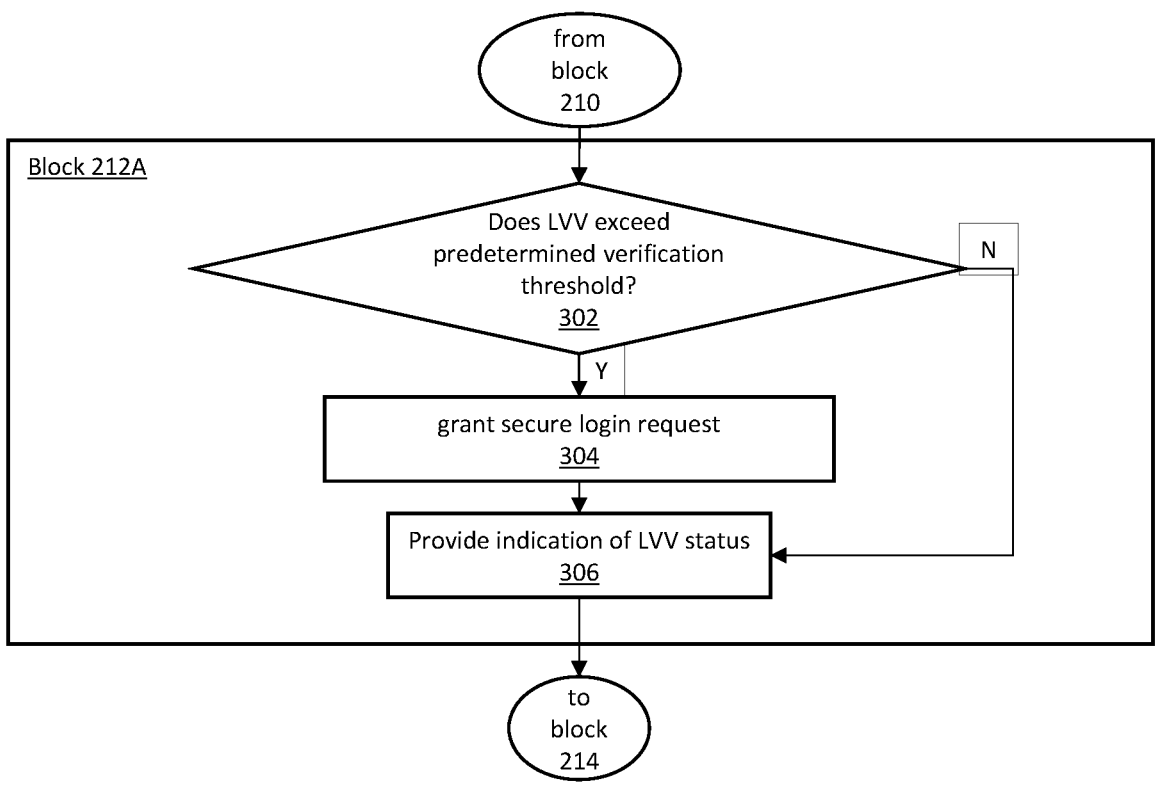
FIG. 3 is a block illustrating aspects of a method, implemented using the system shown in FIG. 1, for confirming a device location using real-time celestial body mapping, according to aspects of the invention.

Now with particular reference to FIG. 3, aspects of the analysis conducted by Location Verification Value Assessment Module "LVVAM" 148 will be described. In block 302, the server computer 102 determines whether the LVV 146 exceeds a predetermined verification threshold. In an embodiment, the verification threshold is 95% of a maximum similarity value (e.g., 95% of unity, when measured by cosine similarity assessments) or other value selected in accordance with the judgment of one skilled in this field. According to aspects of the invention, when the LVV exceeds the verification threshold, the LVVAM 150 determines that the primary device 108 is occupying a measured orientation 142 while in the DVP (e.g., shown in FIG. that is sufficiently similar to an expected orientation 144 for a device located at the indicated location 140. If the LVV 146 does not exceed the verification threshold described above, flow continues to block 306. If the LVV 146 exceeds the verification threshold described above, the server computer 102 determines the indicated device location is verified and, flow continues to block 304, in which, according to aspects of the invention, the server computer 102 grants a request for a secure login. The server computer 102 at block 306, via a user interface (e.g., the display 130), provides an indication of the LVV (e.g., indicated location authentication status) and flow returns to block 214.

Figure 9:
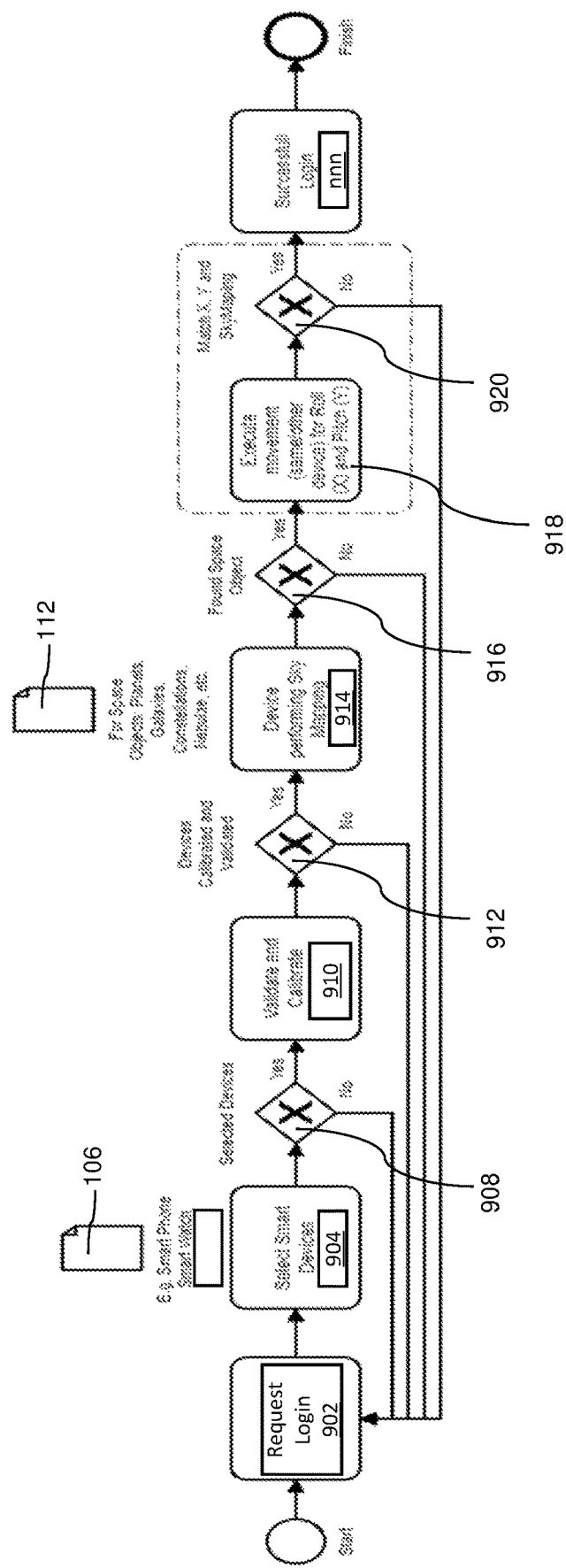
FIG. 9 is a flowchart illustrating aspects of an alternate method, implemented using the system shown in FIG. 1, for confirming a device location using real-time celestial body mapping, according to aspects of the invention.

Now with particular reference to FIG. 9, an alternate method for confirming a device location using real-time celestial body mapping, according to aspects of the invention will be discussed. In block 902, the server computer 102 receives a login request. In an embodiment, the request is received via a User Interface "UI" associated with device display 130. In block 904, the server computer receives, via the UI, an indication of a set devices 106 (e.g., smart phone, smart watch, tablet, etc.) available for multi-factor authentication (MFA). At block 908, the server computer 102 waits for a preferred set of devices 108 (from within the available set 906) to be identified. At block 910, the server computer 102, confirms the preferred devices are suitable for MFA use and directs a user to move the device 108 in a calibration motion. At block 912, the server computer 102 receives an indication of a device location and waits for the directed calibration motion to be completed. At block 914, the server computer 102 generates a celestial map using the corpus of Astronomical Reference Object "ARO" metadata 112. At block 916, the server computer 102 identifies a selected Astronomical Reference Object 113 (e.g., a space object having a real-time representation 126 within the device display 130) and wait for the user to find the selected object within the display. At block 918, the server computer 102 identifies directs the user to move the device 108 into a verification position, in which a device reference indicator "DRI" 128 is substantially alignment with the ARO representation 126 (e.g., by conducting roll and pitch adjustments or other adjustments necessary to bring the DRI and ARO representation into an overlapping arrangement in the display). At block 920, the server computer 102 determines whether the orientation movements registered in block 918 match a set of expected orientation movements (for a device at the indicated location), and the server computer 102 grants login access at block 922 when the registered orientation movements and expected orientation movements have a similarity (LVV) that exceeds the verification threshold (e.g., as described above).

Regarding the flowcharts and block diagrams, the flowchart and block diagrams in the Figures of the present disclosure illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
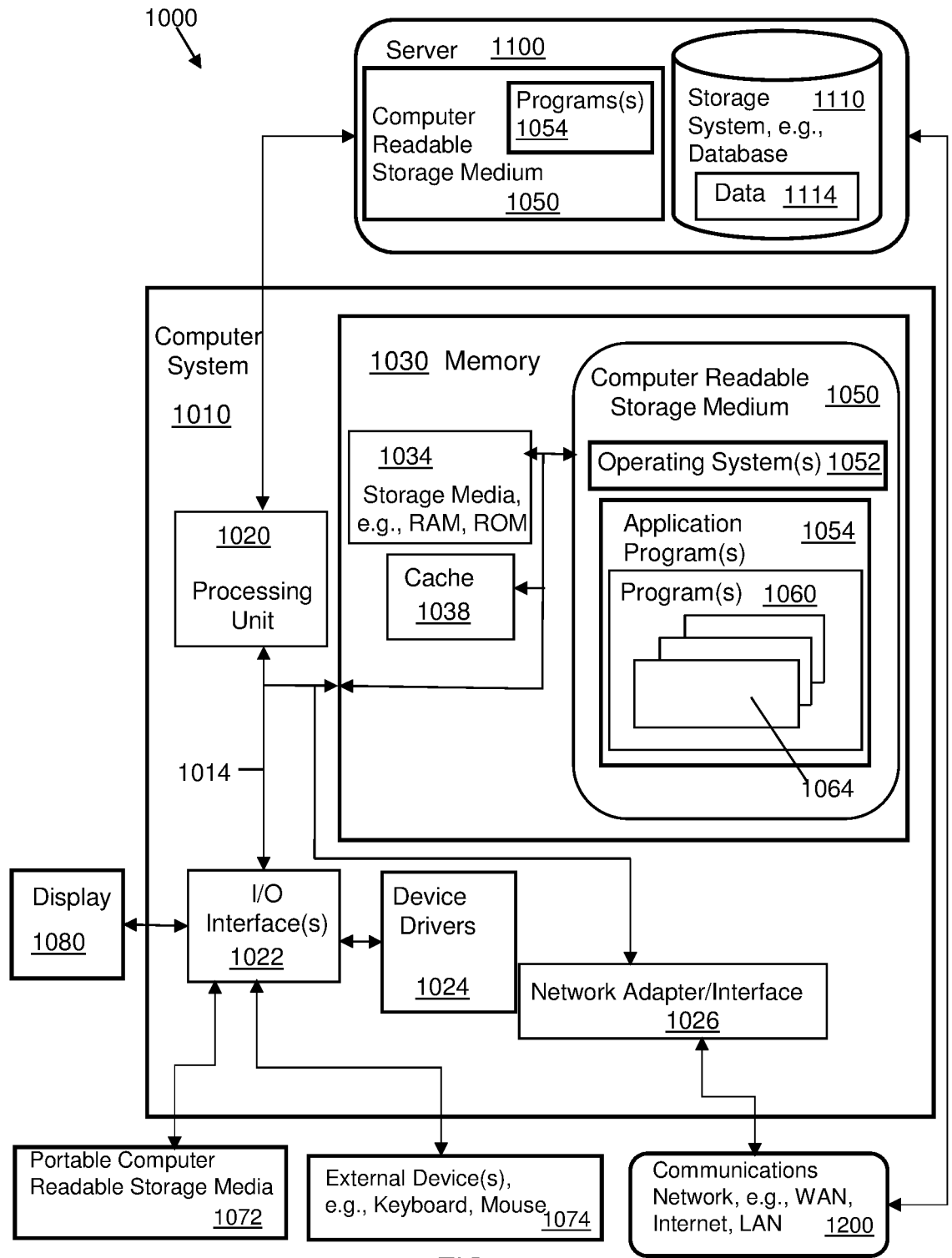
FIG. 10 is a schematic block diagram depicting a computer system according to an embodiment of the disclosure which may be incorporated, all or in part, in one or more computers or devices shown in FIG. 1, and cooperates with the systems and methods shown in FIG. 1.

Referring to FIG. 10, a system or computer environment 1000 includes a computer diagram 1010 shown in the form of a generic computing device. The method of the invention, for example, may be embodied in a program 1060, including program instructions, embodied on a computer readable storage device, or computer readable storage medium, for example, generally referred to as memory 1030 and more specifically, computer readable storage medium 1050. Such memory and/or computer readable storage media includes non-volatile memory or non-volatile storage. For example, memory 1030 can include storage media 1034 such as RAM (Random Access Memory) or ROM (Read Only Memory), and cache memory 1038. The program 1060 is executable by the processor 1020 of the computer system 1010 (to execute program steps, code, or program code). Additional data storage may also be embodied as a database 1110 which includes data 1114. The computer system 1010 and the program 1060 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in the figure as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

The computer 1010 can include a variety of computer readable media. Such media may be any available media that is accessible by the computer 1010 (e.g., computer system, or server), and can include both volatile and non-volatile media, as well as removable and non-removable media. Computer memory 1030 can include additional computer readable media in the form of volatile memory, such as random access memory (RAM) 1034, and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method(s) described in the present disclosure, for example, may be embodied in one or more computer programs, generically referred to as a program 1060 and can be stored in memory 1030 in the computer readable storage medium 1050. The program 1060 can include program modules 1064. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020. It is also understood that the application 1054 and program(s) 1060 are shown generically, and can include all of, or be part of, one or more applications and program discussed in the present disclosure, or vice versa, that is, the application 1054 and program 1060 can be all or part of one or more applications or programs which are discussed in the present disclosure.

One or more programs can be stored in one or more computer readable storage media such that a program is embodied and/or encoded in a computer readable storage medium. In one example, the stored program can include program instructions for execution by a processor, or a computer system having a processor, to perform a method or cause the computer system to perform one or more functions.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
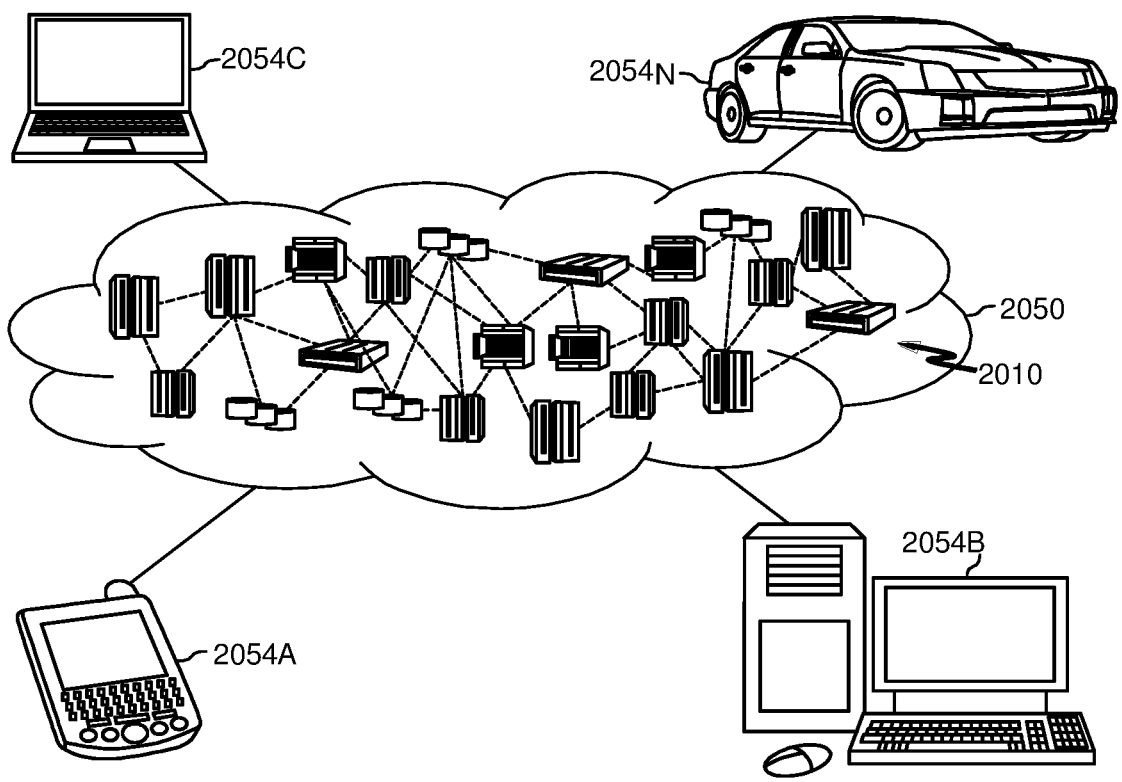
FIG. 11 depicts a cloud computing environment according to an embodiment of the present invention.

Referring now to FIG. 11, illustrative cloud computing environment 2050 is depicted. As shown, cloud computing environment 2050 includes one or more cloud computing nodes 2010 with which local computing devices used by cloud consumers, such as, for example, personal digital assistant (PDA) or cellular telephone 2054A, desktop computer 2054B, laptop computer 2054C, and/or automobile computer system 2054N may communicate. Nodes 2010 may communicate with one another. They may be grouped (not shown) physically or virtually, in one or more networks, such as Private, Community, Public, or Hybrid clouds as described hereinabove, or a combination thereof. This allows cloud computing environment 2050 to offer infrastructure, platforms and/or software as services for which a cloud consumer does not need to maintain resources on a local computing device. It is understood that the types of computing devices 2054A-N shown in FIG. 9 are intended to be illustrative only and that computing nodes 2010 and cloud computing environment 2050 can communicate with any type of computerized device over any type of network and/or network addressable connection (e.g., using a web browser).

Figure 12:
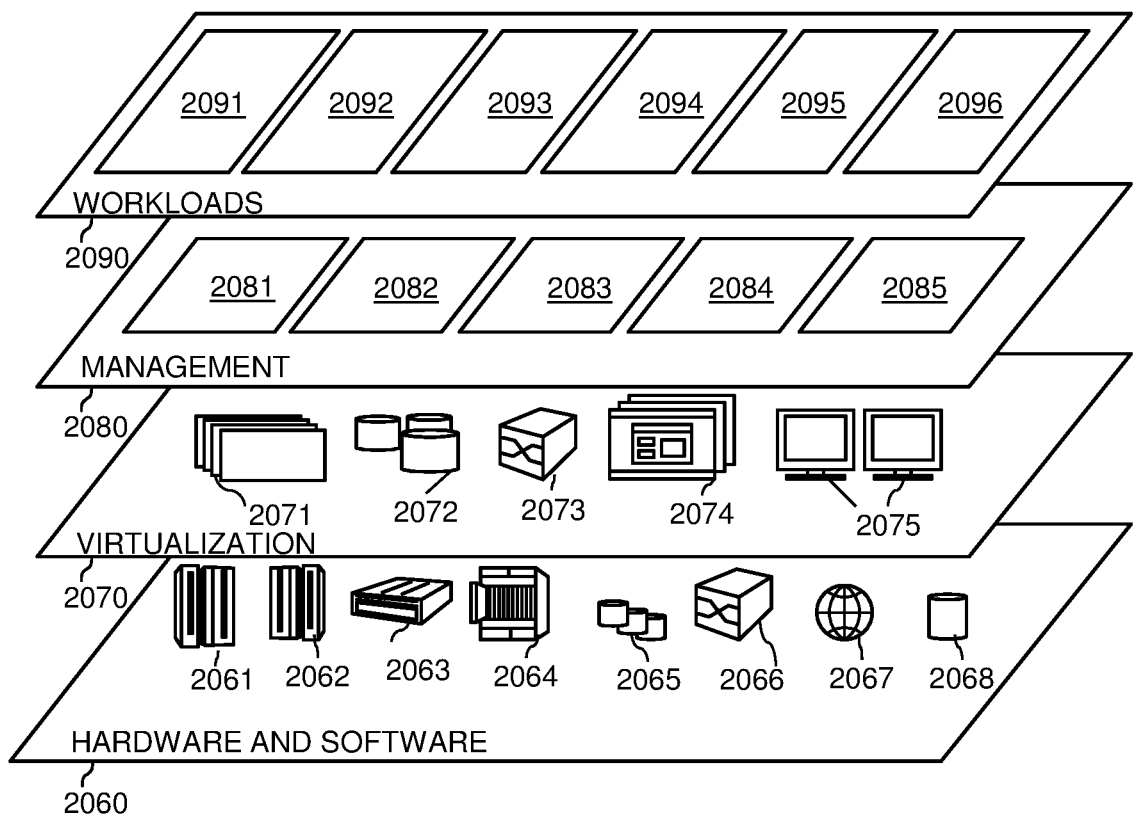
FIG. 12 depicts abstraction model layers according to an embodiment of the present invention.

Referring now to FIG. 12, a set of functional abstraction layers provided by cloud computing environment 2050 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 2060 includes hardware and software components. Examples of hardware components include: mainframes 2061; RISC (Reduced Instruction Set Computer) architecture based servers 2062; servers 2063; blade servers 2064; storage devices 2065; and networks and networking components 2066. In some embodiments, software components include network application server software 2067 and database software 2068.

Virtualization layer 2070 provides an abstraction layer from which the following examples of virtual entities may be provided: virtual servers 2071; virtual storage 2072; virtual networks 2073, including virtual private networks; virtual applications and operating systems 2074; and virtual clients 2075.

In one example, management layer 2080 may provide the functions described below. Resource provisioning 2081 provides dynamic procurement of computing resources and other resources that are utilized to perform tasks within the cloud computing environment. Metering and Pricing 2082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 2083 provides access to the cloud computing environment for consumers and system administrators. Service level management 2084 provides cloud computing resource allocation and management such that required service levels are met. Service Level Agreement (SLA) planning and fulfillment 2085 provide pre-arrangement for, and procurement of, cloud computing resources for which a future requirement is anticipated in accordance with an SLA.

Workloads layer 2090 provides examples of functionality for which the cloud computing environment may be utilized. Examples of workloads and functions which may be provided from this layer include: mapping and navigation 2091; software development and lifecycle management 2092; virtual classroom education delivery 2093; data analytics processing 2094; transaction processing 2095; and verifying a device location 2096.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for verifying a device location, comprising:
   in response to receiving a request to verify a location of a primary device communicatively connected with a computer, receiving an Indicated Primary Device Location "IPDL";
   presenting within a Primary Device Display "PDD", a virtual representation of a predetermined Astronomical Reference Object "ARO" having a known ARO location remote from the primary device, the virtual representation having a dynamic location within the PDD synchronized, at least in part, with a substantially real-time relative offset between a Display Reference Indicator "DRI" and the known ARO location;

responsive to receiving an indication that the primary device is in a Primary Device Verification Position "PDVP" in which the DRI and the ARO virtual representation have a predetermined amount of overlap within the display, receiving primary device orientation metadata from a set of orientation indicating sensors associated with the primary device, and generating a Measured Primary Device Orientation "MPDO" therefrom;

calculating an Expected Device Orientation "EDO" for a reference device arranged in the PDVP while at the IPDL;

generating a Location Verification Value "LVV" based, at least in part, on comparing the MPDO and the EDO; and responsive to determining the LVV exceeds a predetermined verification threshold, providing an indication that the indicated primary device location is verified.

2. The method of claim 1, wherein the known ARO location changes with time and the expected PDVD orientation is calculated using a set of time-sensitive ARO position metadata available to the computer and a relevant reference time from a time source available to the computer.

3. The method of claim 1, wherein the indicated device location is substantially the same as a pre-established target location.

4. The method of claim of 3, wherein the pre-established target location is substantially the same as a user-provided address.

5. The method of claim 1, wherein the orientation indicating sensors associated with the PVD are among a pre-established set of sensors remote from the device.

6. The method of claim 1, wherein the display presents a real-time location of multiple predetermined AROs on a celestial map.

7. The method of claim 1, wherein the primary device is selected from group consisting of smart phone, a smart watch, and a tablet.

8. A system for verifying a device location, which comprises:

a computer system comprising a computer readable storage medium having program instructions embodied therewith, the program instructions executable by a computer to cause the computer to:

in response to receiving a request to verify a location of a primary device communicatively connected with a computer, receive an Indicated Primary Device Location "IPDL";

present within a Primary Device Display "PDD", a virtual representation of a predetermined Astronomical Reference Object "ARO" having a known ARO location remote from the primary device, the virtual representation having a dynamic location within the PDD synchronized, at least in part, with a substantially real-time relative offset between a Display Reference Indicator "DRI" and the known ARO location;

responsive to receiving an indication that the primary device is in a Primary Device Verification Position "PDVP" in which the DRI and the ARO virtual representation have a predetermined amount of overlap within the display, receive primary device orientation metadata from a set of orientation indicating sensors associated with the primary device, and generate a Measured Primary Device Orientation "MPDO" therefrom;

calculate an Expected Device Orientation "EDO" for a reference device arranged in the PDVP while at the IPDL;

generate a Location Verification Value "LVV" based, at least in part, on comparing the MPDO and the EDO; and responsive to determining the LVV exceeds a predetermined verification threshold, provide an indication that the indicated primary device location is verified.

9. The system of claim 8, wherein the known ARO location changes with time and the expected PDVD orientation is calculated using a set of time-sensitive ARO position metadata available to the computer and a relevant reference time from a time source available to the computer.

10. The system of claim 8, wherein the indicated device location is substantially the same as a pre-established target location.

11. The system of claim of 10, wherein the pre-established target location is substantially the same as a user-provided address.

12. The system of claim 8, wherein the orientation indicating sensors associated with the PVD are among a pre-established set of sensors remote from the device.

13. The system of claim 8, wherein the display presents a real-time location of multiple predetermined AROs on a celestial map.

14. The system of claim 8, wherein the primary device is selected from group consisting of smart phone, a smart watch, and a tablet.

15. A computer program product for verify a device location, the computer program product comprising a computer readable storage medium having program instructions embodied therewith, the program instructions executable by a computer to cause the computer to:

in response to receiving a request to verify a location of a primary device communicatively connected with a computer, receive, using the computer, an Indicated Primary Device Location "IPDL";

present, using the computer, within a Primary Device Display "PDD", a virtual representation of a predetermined Astronomical Reference Object "ARO" having a known ARO location remote from the primary device, the virtual representation having a dynamic location within the PDD synchronized, at least in part, with a substantially real-time relative offset between a Display Reference Indicator "DRI" and the known ARO location;

responsive to receiving an indication that the primary device is in a Primary Device Verification Position "PDVP" in which the DRI and the ARO virtual representation have a predetermined amount of overlap within the display, receive, using the computer, primary device orientation metadata from a set of orientation indicating sensors associated with the primary device, and generate a Measured Primary Device Orientation "MPDO" therefrom;

calculate, using the computer, an Expected Device Orientation "EDO" for a reference device arranged in the PDVP while at the IPDL;

generate, using the computer, a Location Verification Value "LVV" based, at least in part, on comparing the MPDO and the EDO; and responsive to determining the LVV exceeds a predetermined verification threshold, provide, using the computer, an indication that the indicated primary device location is verified.

16. The computer program product of claim 15, wherein the known ARO location changes with time and the expected PDVD orientation is calculated using a set of time-sensitive ARO position metadata available to the computer and a relevant reference time from a time source available to the computer.

17. The computer program product of claim 15, wherein the indicated device location is substantially the same as a pre-established target location.

18. The computer program product of claim 15, wherein the orientation indicating sensors associated with the PVD are among a pre-established set of sensors remote from the device.

19. The computer program product of claim 15, wherein the display presents a real-time location of multiple predetermined AROs on a celestial map.

20. The computer program product of claim 15, wherein the primary device is selected from group consisting of smart phone, a smart watch, and a tablet.

* * * * *